UNITED STATES PATENT OFFICE.

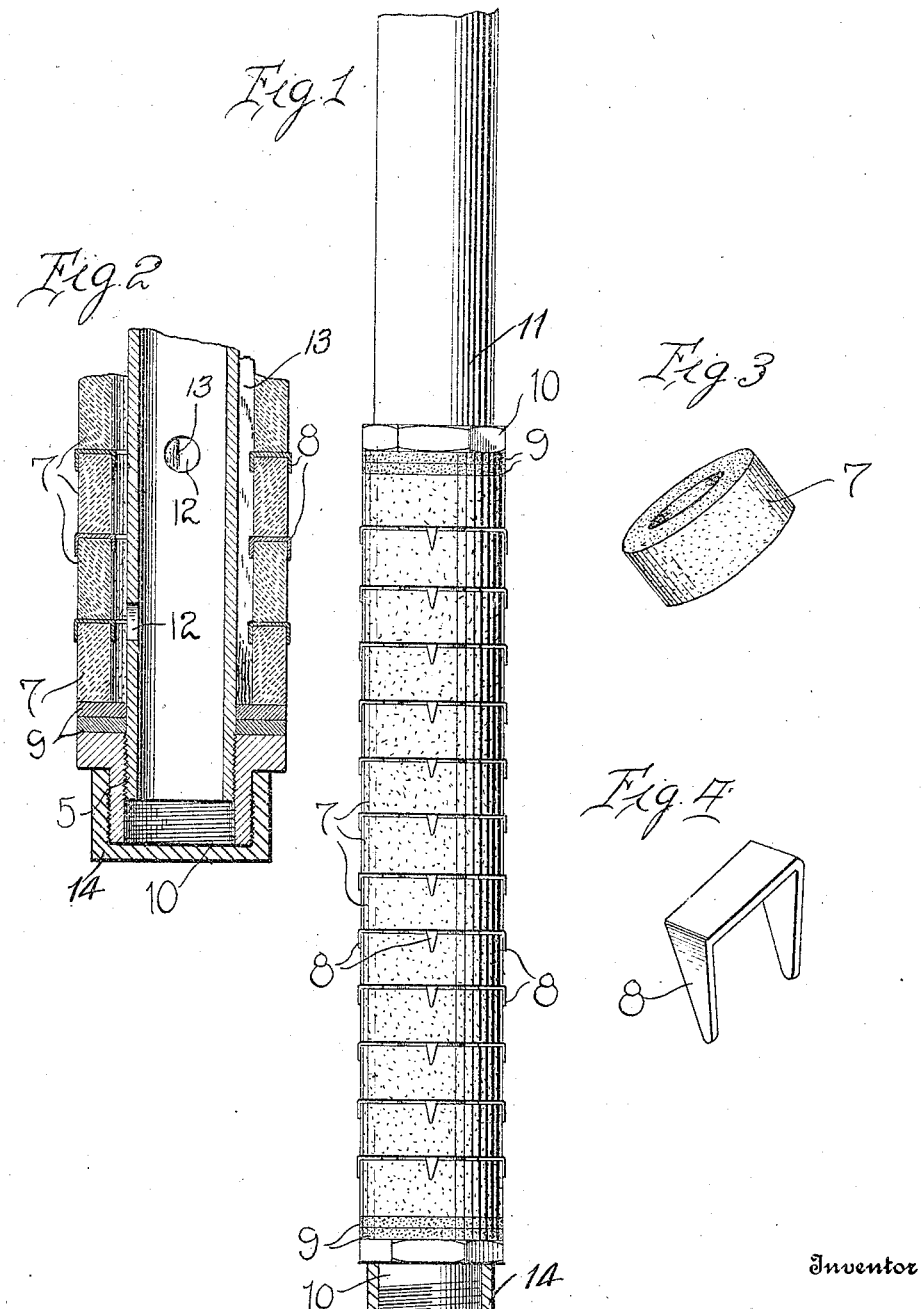

FRANCIS JASZKOWIAK, OF BISMARCK, NORTH DAKOTA.

WELL-FILTER.

1,146,499.     Specification of Letters Patent.     Patented July 13, 1915.

Application filed December 12, 1914. Serial No. 876,875.

*To all whom it may concern:*

Be it known that I, FRANCIS JASZKOWIAK, a citizen of the United States, residing at Bismarck, in the county of Burleigh and State of North Dakota, have invented certain new and useful Improvements in Well-Filters, of which the following is a specification, reference being had to the accompanying drawings.

This invention relates to an improved well filter or strainer, and has for its primary object to provide an improved filtering medium in the form of a homogeneous plastic body consisting of sand and cement.

The invention has for an additional object to provide a well filter including a plurality of filtering rings, and means for securing said rings upon a suitable body in spaced relation to each other.

The invention has for a further general object to produce a filter or strainer of the above type which will not rust or corrode and will effectively strain or filter the water.

With the above and other objects in view, my invention consists in the novel features of construction, combination, and arrangement of parts to be hereinafter more fully described, claimed, and illustrated in the accompanying drawing, in which, Figure 1 is a side elevation of an improved filter or strainer for wells embodying the preferred construction of my invention; Fig. 2 is an enlarged fragmentary longitudinal section; Fig. 3 is a detail perspective view of one of the filtering rings; and Fig. 4 is a similar view of one of the spacing members.

Referring in detail to the drawing, 5 designates a tubular rod, the opposite ends of which are exteriorly threaded for a purpose which will be hereinafter clearly pointed out. The filtering rings or stones 7 are formed of a homogeneous plastic material in a suitable mold, said material consisting of cement and fine sand. The internal diameter of these filtering rings 6 is greater than the external diameter of the tubular rod 5 so that when said rings are arranged upon the rod, they will be disposed in spaced concentric relation thereto. The rod 5 is provided with a plurality of openings 12.

In assembling the parts of the device, the rings are arranged upon the rod 5, and between the opposed faces of the rings, the substantially U-shaped metal strips 8, preferably of copper, are disposed. The extremities of these metal strips extend upon the outer and inner faces, respectively, of the rings, while the intermediate portions of said strips space or separate the contiguous faces of the rings from each other. After the filtering rings have been arranged upon the rod 5 in this manner, the washers 9 of leather or other material, are engaged upon the ends of the rod 5 and against the end rings. Coupling members 10 are then threaded upon the ends of the rod into engagement with said washers to securely clamp the several filtering rings 6 in position and hold the same against relative movement. One of the coupling members is adapted to be connected to the pump barrel 11 whereby the filter may be lowered into the well, while a suitable cap member 14 is threaded upon the other of said members.

From the above description, the use of the invention will be readily understood. The several parts having been assembled as described, the filter is lowered into the well and the water entering between the several filtering stones or rings will permeate the same. By spacing the rings from the tube 5, upon which they are arranged, the water may pass freely through these spaces, without carrying the sand to the interior of the tubular rod to be drawn upwardly in the operation of the pump. The device is primarily designed for use in quicksand beds, and the rings 7 are properly spaced from each other, in accordance with the fineness of the sand, so that the sand grains cannot enter to the interior of the filtering rings through the spaces between the same. By spacing the rings, however, so that the water may flow therebetween, the water flow is much more rapid than if the rings were closely engaged so that the water would only seep therethrough. In this manner, it will be appreciated that the filtering operation is greatly facilitated. The several rings may be very easily and quickly removed for the purpose of cleaning the same, or providing new rings.

It will be understood that metal strips 8 of various thicknesses may be employed so as to space the filtering rings from each other, as particular circumstances may indicate to be necessary.

I have found, in the actual use of my invention, that the combination of sand and cement provides an excellent filtering medium. Rust or corrosion is thus obviated so that the water will not be deleteriously affected and the well thus rendered useless.

It is, of course, obvious that any desired number of the filtering rings may be employed, and the same may also be greatly varied in diameter and form, as may be desired. The invention is also susceptible of many other modifications in the form, proportion, and arrangement of the several elements, and I, therefore, reserve the privilege of resorting to all such legitimate changes as may be fairly embodied within the spirit and scope of the invention as claimed.

As an additional means for preventing any possibility of shifting movement of the filtering rings with respect to the tubular rod, strips indicated at 13 are disposed between the inner surfaces of the rings and the periphery of said rod. Any desired number of these strips may be employed and they may be constructed of wood, or of the same material as the filtering rings. The rings may be made of various degrees of hardness so that the water may permeate the same or filter through the rings, as well as between the same.

Having thus fully described my invention, what I desire to claim and secure by Letters Patent is:—

1. A filter of the class described including a plurality of filtering members, and means removably interposed between said members to space the same from each other and provide passages between said members.

2. A filter of the class described including a plurality of filtering members adapted to be arranged in superposed relation, and means independent of said members to be detachably associated therewith when the members are assembled, whereby the opposed faces of the filtering members may be spaced apart to provide passage between said members.

3. A filter of the class described including a plurality of filtering members adapted to be arranged in superposed relation and having unobstructed opposed faces, and means adapted to be placed between the opposed faces of the filtering members when the same are assembled to space said faces from each other and provide passages between said members.

4. A filter of the class described including a plurality of superposed filtering members, and means removably disposed between said members to space the contiguous faces thereof and provide passages between said members.

5. A filter of the class described including a plurality of filtering rings arranged in superposed relation, and U-shaped metal spacing members engaged over the edges of said rings and spacing the same from each other.

6. A filter of the class described including a rod, a plurality of filtering rings arranged upon said rod in superposed relation and in spaced relation to said rod, U-shaped metal spacing strips engaged upon the edges of said rings to space the opposed faces of adjacent rings, and means removably engaged upon the ends of said rod to clamp said rings and the metal spacing strips together and hold the same against relative movement.

7. A filter of the class described including a plurality of superposed filtering members, means for securing said members upon a tubular pump rod in spaced relation thereto, and spaced longitudinally extending members arranged between the filtering members and said rod to prevent lateral shifting movement of the filtering members with respect to the rod.

8. A filter of the class described including a plurality of superposed spaced filtering members, means for securing said members upon a tubular pump rod in spaced relation thereto, and means arranged between said filtering members and the rod to prevent movement of the members with respect to said rod.

In testimony whereof I hereunto affix my signature in the presence of two witnesses.

FRANCIS JASZKOWIAK.

Witnesses:
F. E. McCurdy,
Dora E. Ranney.